United States Patent [19]
Miller et al.

[11] Patent Number: 4,923,431
[45] Date of Patent: May 8, 1990

[54] CHAFF SPREADER

[76] Inventors: DuWayne A. Miller, Box 236, Isabel, S. Dak. 57633; George F. Miller, Box 72, Manning, N. Dak. 58642

[21] Appl. No.: 338,947

[22] Filed: Apr. 17, 1989

[51] Int. Cl.$^5$ ........................ A01F 29/12; A01F 12/48
[52] U.S. Cl. ..................................... 460/111; 460/112; 56/13.3; 239/655; 239/682; 239/689
[58] Field of Search ....................... 56/12.8, 13.3, 13.4, 56/14.6, 16.4, 16.5, 16.6; 460/111, 112; 209/255, 257; 239/655, 661, 682, 689; 241/222; 322/99; 340/684

[56] References Cited

U.S. PATENT DOCUMENTS

| | | | |
|---|---|---|---|
| 2,865,416 | 12/1958 | Hetteen | 239/679 |
| 3,005,637 | 10/1961 | Hetteen | 460/112 |
| 3,368,214 | 2/1968 | Swanson | 340/684 |
| 3,583,405 | 6/1971 | Gerhardt et al. | 340/684 |
| 3,623,059 | 11/1971 | Richerd | 340/684 |
| 3,670,739 | 6/1972 | Rowland-Hill | 460/112 |
| 3,925,968 | 12/1975 | Wagenhals | 56/13.3 |
| 4,056,107 | 11/1977 | Todd et al. | 460/112 |
| 4,137,923 | 2/1979 | Druffel et al. | 460/112 |
| 4,324,091 | 4/1984 | Wistuba et al. | 56/16.6 |
| 4,393,644 | 7/1983 | Martenas | 56/12.8 |
| 4,426,826 | 1/1984 | Wesselmann | 56/13.3 |
| 4,591,102 | 5/1986 | Clarke | 239/689 |
| 4,614,080 | 9/1986 | Hoepfner et al. | 56/16.6 |
| 4,711,253 | 12/1987 | Anderson | 56/13.3 |
| 4,735,216 | 4/1988 | Scott et al. | 460/112 |

*Primary Examiner*—Bruce M. Kisliuk
*Attorney, Agent, or Firm*—Jerry T. Kearns

[57] ABSTRACT

A chaff spreader for attachment to a combine includes a pair of spaced circular mounting rings, each having a fan rotatably mounted therein. An elongated drive shaft extends between the fans and is connected to a belt and pulled drive system for rotating the fans. A semi-cylindrical shroud is secured between the mounting rings and partially surrounds the fans. An open side wall portion of the shroud is directed forwardly toward the sieve of the combine for inducting chaff through the fans and laterally outwardly from the combine. The belt and pulley drive system is connected to a pulley on a straw chopper section of the combine. In a second embodiment, a generator driven light is mounted on the combine, adjacent the fans to serve as a warning to indicate fan rotation. The shaft spreader collects chaff through a suction effect created by the fans and spreads chaff evenly across the width of the cut, eliminating the toxic effect to seedlings growing through a concentration of chaff residue.

1 Claim, 5 Drawing Sheets

CHAFF SPREADER

BACKGROUND OF THE INVENTION

1. Field of the Invention

The present invention relates to chaff spreaders, and more particularly pertains to an improved chaff spreader for attachment to a combine. The chaff or residue produced by a conventional combine is concentrated in a relatively narrow trail deposited after each swath has been cut. This chaff residue creates a toxic effect which inhibits the growth of new seedlings during the subsequent growing season. In order to enable the practice of economical and environmentally safe no-till and minimum-till farming, the chaff residue must be spread evenly across the width of the cut, to eliminate this toxic effect. In order to overcome this problem, the present invention provides an improved chaff spreader for attachment to a combine which evenly distributes the chaff residue.

2. Description of the Prior Art

Various types of collector attachments for agricultural vehicles are known in the prior art. A typical example of such a device is to be found in U.S. Pat. No. 3,925,968, which issued to F. Wagenhals on Dec. 16, 1975. This patent discloses a rotary mulcher attachment for a conventional tractor type lawn mower. The mulcher includes a cylindrical housing in a which plurality of mulcher-impeller blades are mounted for rotation about a generally horizontal axis extending centrally through the housing. The mulcher includes baffle plates which extend into the discharge opening of the mower housing for guiding cut material to an inlet opening in the lower portion of the mulcher housing. A collection bag is disposed at an outlet of the mulcher housing. U.S. Pat. No. 4,324,091, which issued to E. Wistuba et al on Apr. 13, 1984, discloses a vehicular forage harvester which includes a trailer wagon pivotally connected thereto having a chute operating to deliver an agricultural crop cut by the forage harvester into the trailer wagon. The chute includes a flexible section which enables the discharge end of the chute to be maintained in a position to deposit crop into the trailer wagon when the vehicle is pivotally moved relative to the forage vehicle. U.S. Pat. No. 4,393,644, which issued to W. Martenas on Jul. 19, 1983, discloses a forage harvester controlled by two-speed belt drives for operating a blower between a first and a second speed for improved operating efficiency U.S. Pat. No. 4,426,826, which issued to W. Wesselmann on Jan. 24, 1984, discloses a self propelled sugar cane harvester including a picking and comminuting device, an inclined conveyor, a discharge transversely inclined conveyor and a pressure fan located in the region of an outlet end of the inclined conveyor to direct an air stream through a comminuted sugar cane stream. U.S. Pat. No. 4,614,080, which issued to T. Hoepfner et al on Sep. 30, 1986, discloses a grass collector blower for attachment to a rotary lawn mower tractor vehicle. The grass collector blower has an impeller located within an upright housing attached to a side of the mower. A belt and pulley drive connects a horizontal impeller shaft to an upright blade shaft of the mower to rotate the impeller concurrently with the grass cutting blades of the mower. The rotating impeller draws grass clippings and other loose material from the mower and discharges the material into collection bags mounted on the rear of the tractor.

While the above mentioned devices are suited for their intended usage, none of these devices disclose a chaff spreader for attachment behind a sieve of a combine which includes a drive shaft operably connected for driving a pair of spaced fans supported within circular mounting rings and including a semicylindrical shroud partially surrounding the fans and having an open side wall portion directed forwardly toward the sieve of the combine for collecting and evenly distributing chaff residue. Inasmuch as the art is relatively crowded with respect to these various types of chaff spreaders, it can be appreciated that there is a continuing need for and interest in improvements to such chaff spreaders, and in this respect, the present invention addresses this need and interest.

SUMMARY OF THE INVENTION

In view of the foregoing disadvantages inherent in the known types of chaff spreaders now present in the prior art, the present invention provides an improved chaff spreader. As such, the general purpose of the present invention, which will be described subsequently in greater detail, is to provide a new and improved chaff spreader which has all the advantages of the prior art chaff spreaders and none of the disadvantages.

To attain this, representative embodiments of the concepts of the present invention are illustrated in the drawings and make use of a chaff spreader for attachment to a combine which includes a pair of spaced circular mounting rings, each having a fan rotatably mounted therein. An elongated drive shaft extends between the fans and is connected to a belt and pulley drive system for rotating the fans. A semi-cylindrical shroud is secured between the mounting rings and partially surrounds the fans. An open side wall portion of the shroud is directed forwardly toward the sieve of the combine for inducting chaff through the fans and laterally outwardly from the combine. The belt and pulley drive system is connected to a pulley on a straw chopper section of the combine. In a second embodiment, a generator driven light is mounted on the combine, adjacent the fans to serve as a warning to indicate fan rotation. The shaft spreader collects chaff through a suction effect created by the fans and spreads chaff evenly across the width of the cut, eliminating the toxic effect to seedlings growing through a concentration of chaff residue.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved chaff spreader which has all the advantages of the prior art chaff spreaders and none of the disadvantages.

It is another object of the present invention to provide a new and improved chaff spreader which may be easily and efficiently manufactured and marketed.

It is a further object of the present invention to provide a new and improved chaff spreader which is of a durable and reliable construction.

An even further object of the present invention is to provide a new and improved chaff spreader which is susceptible of a low cost of manufacture with regard to both materials and labor, and which accordingly is then susceptible of low prices of sale to the consuming public, thereby making such chaff spreaders economically available to the buying public.

Still yet another object of the present invention is to provide a new and improved chaff spreader which provides in the apparatuses and methods of the prior art some of the advantages thereof, while simultaneously overcoming some of the disadvantages normally associated therewith.

Still another object of the present invention is to provide a new and improved chaff spreader for combines which utilizes rotary fans to distribute chaff through a suction effect.

Yet another object of the present invention is to provide a new and improved chaff spreader attachment for combines which includes a semi-cylindrical shroud for directing chaff residue to a pair of spaced rotary fans for lateral distribution.

Even still another object of the present invention is to provide a new and improved chaff spreader attachment for a combine which evenly distributes chaff residue across the width of the combine swath and enables the economical practice of minimum till farming.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
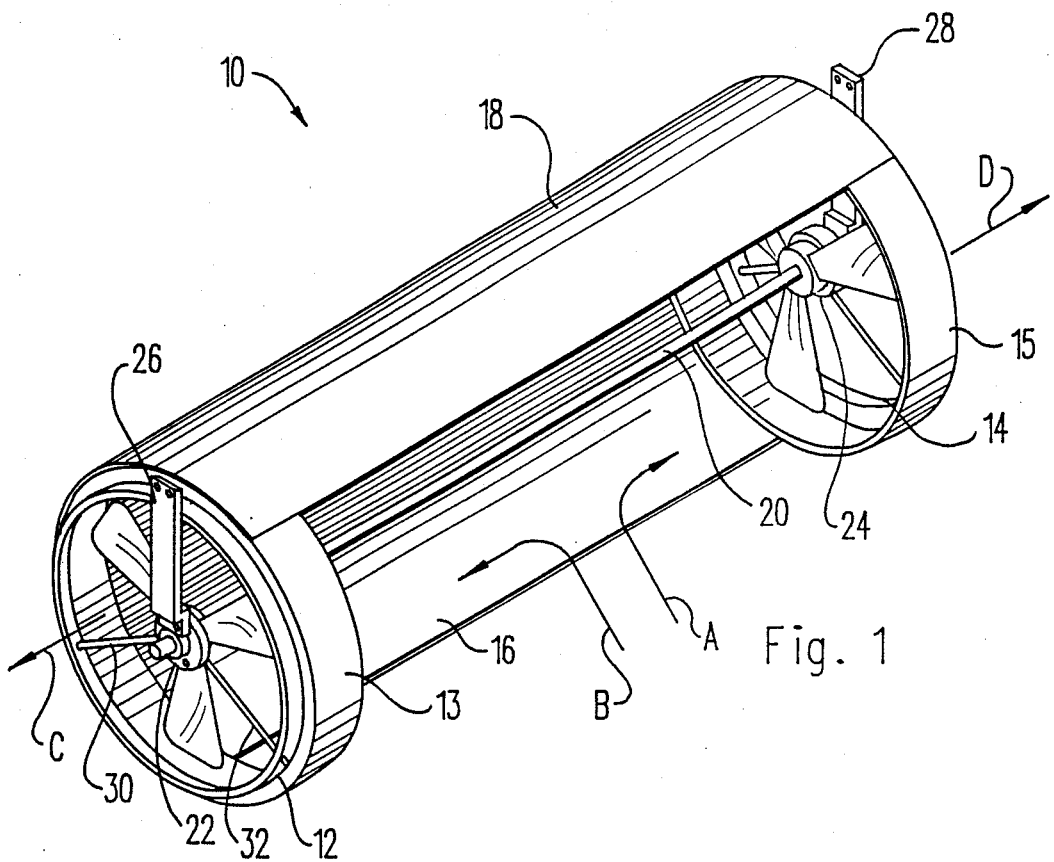
FIG. 1 is a perspective view illustrating the chaff spreader according to a first embodiment of the present invention.

With reference now to the drawings, and in particular to FIG. 1 thereof, a new and improved chaff spreader embodying the principles and concepts of the present invention and generally designated by the reference numeral 10 will be described.

More specifically, it will be noted that the first embodiment 10 of the invention includes a pair of spaced circular mounting rings 12 and 14. A pair of three bladed rotary fans 22 and 24 have stationary hub portions secured within the mounting rings by support struts 30 and 32. A drive shaft 20 extends between the fans 22 and 24 and is operatively connected for rotating the fans in unison. A semi-cylindrical shroud 18 is secured between the mounting rings by support rings 13 and 15. The shroud 18 includes an open side wall portion 16 which is directed forwardly to the sieve section of a combine for collecting chaff residue therefrom. A pair of brackets 26 and 28 are provided for securing the chaff spreader 10 beneath a conventional combine. In use, the rotating fans create a suction effect which inducts chaff residue from the sieve section of the combine into the shroud 18 as indicated by arrows A and B. The fans 22 and 24 blow the inducted residue outwardly as indicated by arrows C and D, thus evenly distributing the chaff residue.

Figure 2:
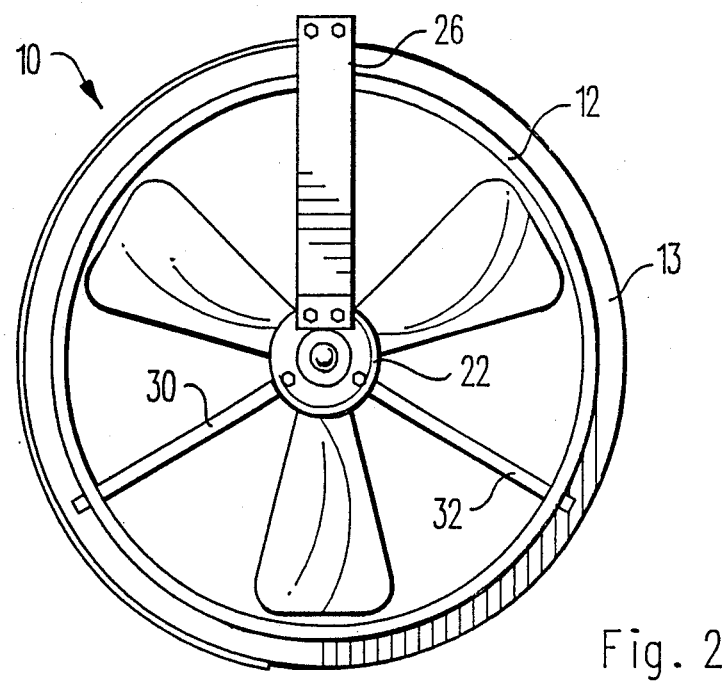
FIG. 2 is an end view of the chaff spreader of FIG. 1.

FIG. 2 is an end view of the chaff spreader attachment.

Figure 3:
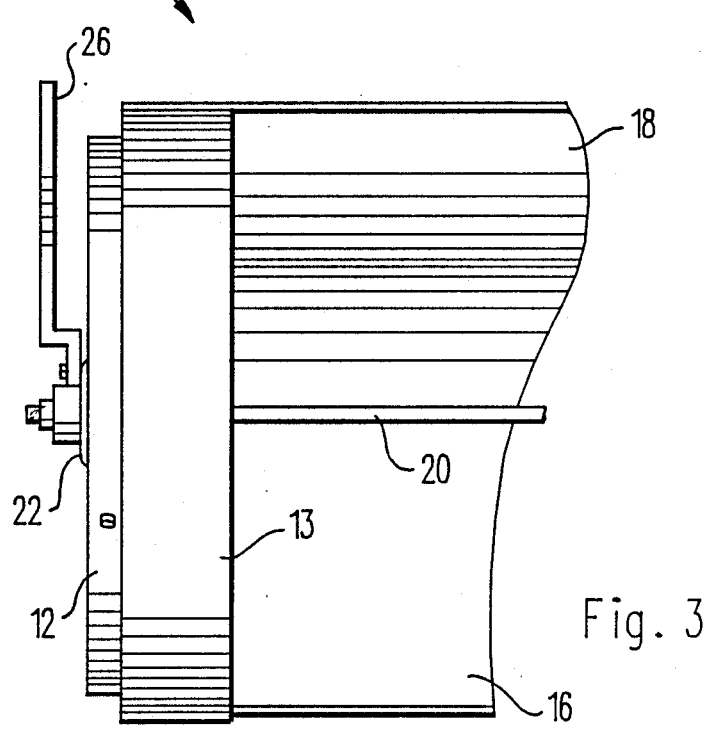
FIG. 3 is a side detail view further illustrating the chaff spreader construction of FIG. 1.

FIG. 3 is an enlarged detail view which further illustrates the shroud support ring 13 securing the shroud 18 to the mounting rings 12.

Figure 4:
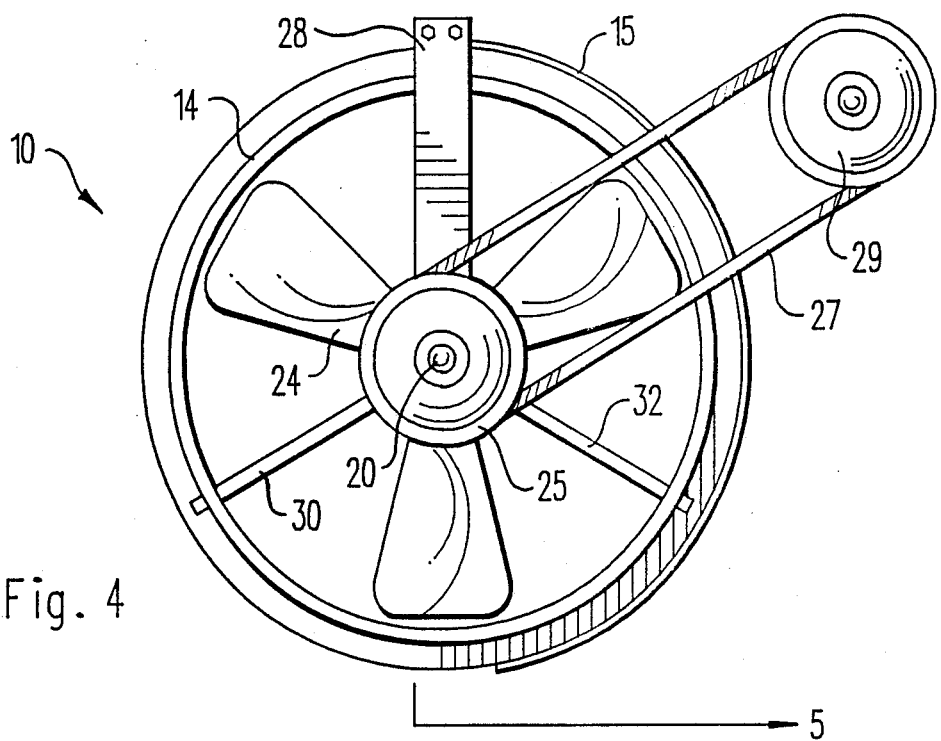
FIG. 4 is an opposite end view illustrating the belt and pulley rotary drive system.

FIG. 4 illustrates an opposite end view of the chaff spreader attachment 10 which includes a pulley 25 secured to the drive shaft 20. A belt 27 extends between the pulley 25 and a pulley 29 adapted for securement to a rotary shaft driven by the straw chopper portion of a conventional combine. The pulley 25, belt 27 and pulley 29 thus provide a power take-off belt drive system for rotatably driving the shaft 20 and attached fans.

Figure 5:
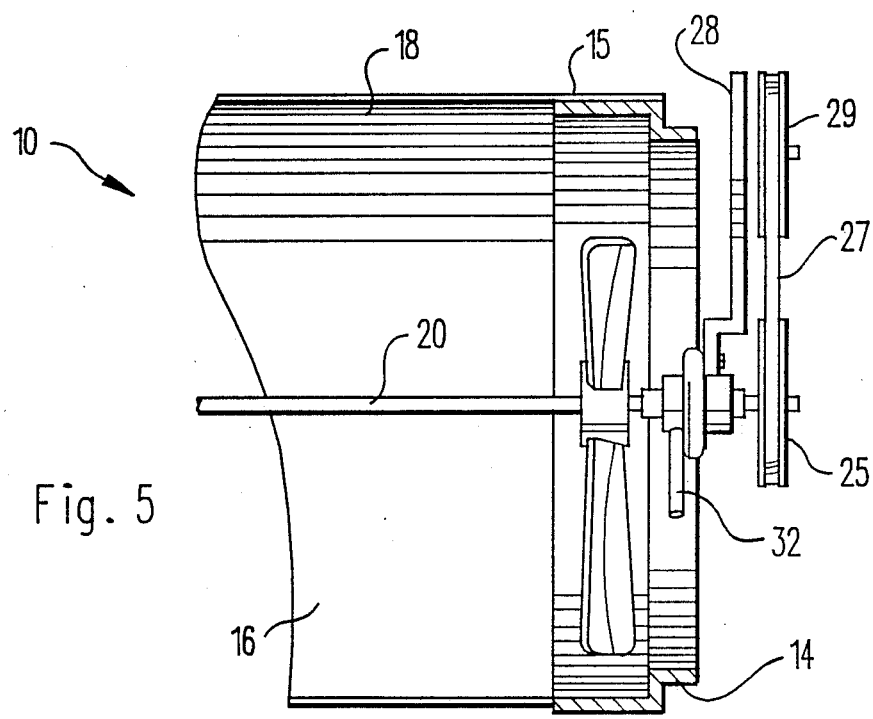
FIG. 5 is a cross sectional view, taken along line 5 of FIG. 4.

FIG. 5 is a cross sectional view, taken along line 5 of FIG. 4, which further illustrates the drive arrangement. It should be understood that the pulley 29 may include an additional sheave for receiving a take-off belt attached to a straw chopper portion of the combine.

Figure 6:
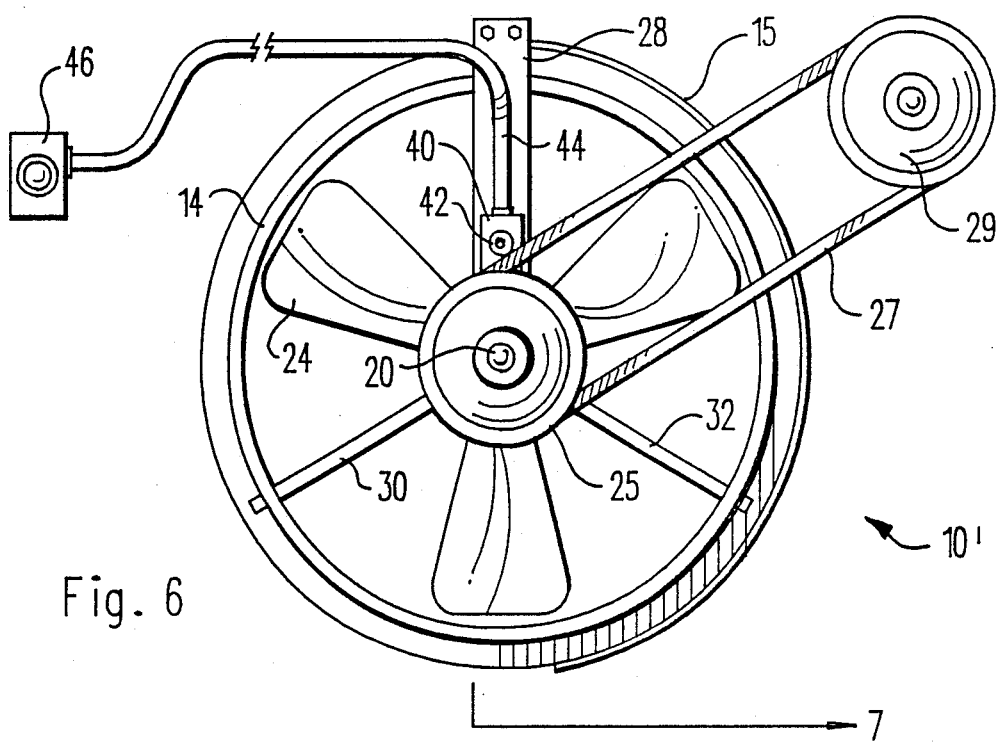
FIG. 6 is an end view of the chaff spreader according to a second embodiment of the present invention, including an operation indication warning light.

FIG. 6 illustrates an alternative embodiment 10' of the present invention, in which a small generator 40 including a friction drive roller 42 is secured to the mounting bracket 28. The friction drive roller 22 is driven by contact with the belt 27 and includes an electrical output connection 44 attached for illuminating an operation indicator warning light 46 upon rotation of the shaft 20. This provides a warning to individuals adjacent the combine of the rotation of the fan blades.

Figure 7:
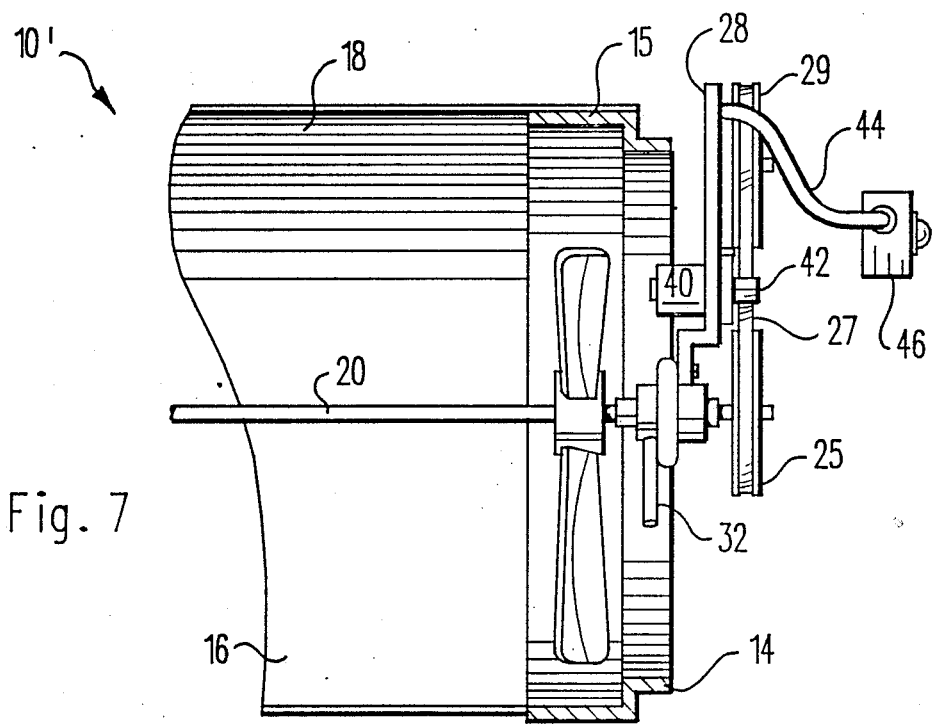
FIG. 7 is a cross sectional view, taken along line 7 of FIG. 6.

FIG. 7 depicts a cross sectional view, taken along line 7 of FIG. 6, which further illustrates the warning light system.

Figure 8:
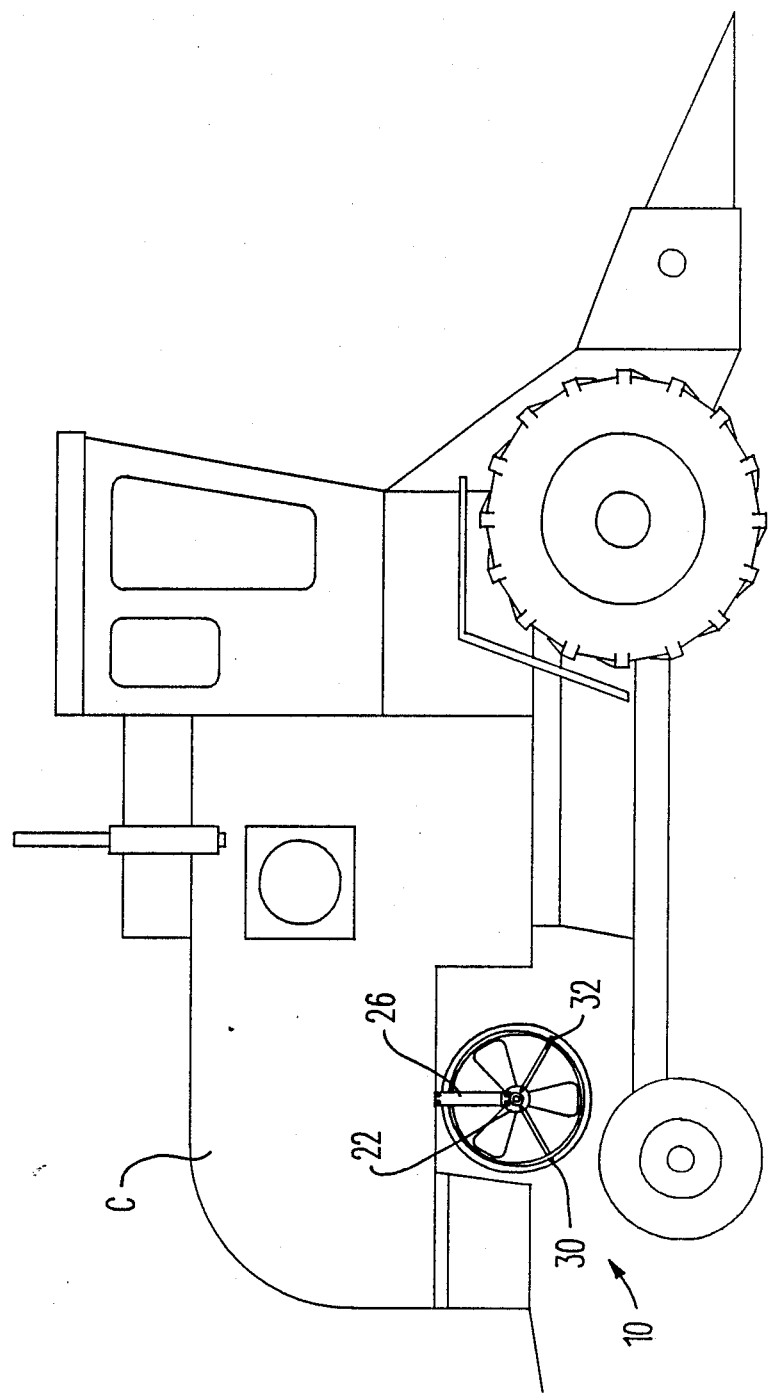
FIG. 8 is a side view illustrating a combine including the chaff spreader attachment of the present invention.

FIG. 8 illustrates a side view of a conventional combine C which includes the chaff spreader attachment 10 mounted below the combine, behind the sieve section thereof. Thus, the chaff spreader attachment 10 is mounted in a protected location, transversely beneath the combine C and thus minimizes the potential of injury to individuals working near the combine. The device is inexpensively constructed and may be easily installed on existing conventional combines.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. In combination with a combine having a straw chopper and a sieve, the improvement comprising a chaff spreader attachment, said chaff spreader attachment including:
a pair of spaced circular mounting rings;
a stationary hub disposed coaxially within each of said mounting rings;
a plurality of radial support struts secured between each of said mounting rings and said stationary hubs;
a fan rotatably mounted on each of said stationary hubs;
an elongated drive shaft extending between said fans and supported for rotation within said stationary hubs, said drive shaft extending transversely beneath said combine and mounting said fans for rotation in a vertical plane about a horizontal axis;
a belt and pulley drive connected by a belt from said straw chopper on said combine for rotating said drive shaft;
an increased stepped diameter shroud support ring formed integrally with each of said circular mounting rings, said shroud support rings oriented axially inwardly from said circular mounting rings, along said drive shaft;
a semi-cylindrical shroud secured between said shroud support rings, said shroud having interior sidewall portions in abutment with said shroud support rings, and having an open side wall portion directed forwardly toward a sieve of a combine and partially surrounding said fans;
said fans each having a pitch configuration for inducting air and chaff through said open side wall portion of said shroud and exhausting air and chaff only through said circular mounting rings;
a pair of brackets securing said mounting rings to said combine, each of said brackets having a first end connected directly to one of said stationary hubs; and
a generator driven by said belt and pulley drive and a warning light powered by said generator to indicate rotation of said fans.

* * * * *